United States Patent [19]

Yuda et al.

[11] 4,436,273
[45] Mar. 13, 1984

[54] FASTENING MEANS FOR REARVIEW MIRROR IN AUTOMOBILE INTERIOR

[75] Inventors: Takuo Yuda, Yokohama; Yoshiaki Notoya, Zushi, both of Japan

[73] Assignee: Nifco Inc., Yokohama, Japan

[21] Appl. No.: 329,491

[22] Filed: Dec. 10, 1981

[30] Foreign Application Priority Data

Dec. 16, 1980 [JP] Japan .................. 55-179562[U]

[51] Int. Cl.³ ............................................. F16M 13/00
[52] U.S. Cl. ........................................ 248/549; 52/98; 248/DIG. 9; 403/2; 411/2; 411/41
[58] Field of Search .............. 248/548, 549, DIG. 9; 350/307; 52/98, 99, 100; 411/2, 41; 285/2, 3; 403/2

[56] References Cited

U.S. PATENT DOCUMENTS

| Re. 19,177 | 5/1934 | Chance | 52/100 |
|---|---|---|---|
| 1,301,010 | 4/1919 | Schrade | 52/98 |
| 1,854,048 | 4/1932 | Lauster | 285/3 |
| 2,678,585 | 5/1954 | Ellis | 411/908 X |
| 3,599,926 | 8/1971 | Takahashi | 248/549 |
| 3,765,295 | 10/1973 | Ptak | 411/41 |
| 4,027,436 | 6/1977 | Daly | 52/98 X |
| 4,263,833 | 4/1981 | Loudin et al. | 411/41 |

FOREIGN PATENT DOCUMENTS 2223666 12/1973 Fed. Rep. of Germany ...... 248/549

Primary Examiner—J. Franklin Foss
Assistant Examiner—David L. Talbott
Attorney, Agent, or Firm—J. R. Halvorsen; T. W. Buckman

[57] ABSTRACT

A fastening means for a rearview mirror in an automobile interior, which comprises a fastening base formed on the supporting arm of the rearview mirror and a fitting member for securing the fastening base on the automobile body by using a setscrew. The fitting member is provided with a flange-shaped engaging portion having thin-walled portions which is readily broken under an impact which is caused by colliding a human body into the rearview mirror in case of an accidental sudden deceleration of the automobile for example, thereby to permit the mirror to fall off the automobile body.

2 Claims, 5 Drawing Figures

FASTENING MEANS FOR REARVIEW MIRROR IN AUTOMOBILE INTERIOR

BACKGROUND OF THE INVENTION

This invention relates to improvements in and concerning a fastening means for a rearview mirror in an automobile interior such that the rearview mirror will fall off the automobile body under an impact.

As widely known, rearview mirrors used inside existing automobiles are devised so that when human bodies collide with them in case of accidental sudden deceleration of automobiles in motion and the impacts involved happen to exceed a certain level, the rearview mirrors will readily fall from the automobile bodies to preclude otherwise possible infliction of injuries to the human bodies. The rearview mirrors of this type heretofore proposed, however, are so constructed that their attachment to the automobile bodies necessitates a complicated and time-consuming work. Once these rearview mirrors fall off the automobile bodies because of collisions and other accidents, their repair is not easy. Thus, the conventional rearview mirrors have posed problems.

Among the conventional fastening means for rearview mirrors, for example, is counted the fastening means of the type which comprises a base adapted to be directly fastened with screws to the automobile body and a fastening piece integrally formed at the basal end of a supporting arm extended from the rearview mirror proper.

This fastening means secures the rearview mirror on the automobile body by setting the base fast on the automobile body with several setscrews, then mounting the fastening piece of the mirror proper directly on the base, and driving separate setscrews through the fastening piece fast into the screw sockets formed in advance in the base. A thin-walled portion is formed around the edges of the screw sockets in the base. When shocks are exerted to bear on the mirror proper, the thin-walled portion breaks under the impact and consequently causes the fastening piece to fall from the automobile body in conjunction with the portion encompassed by the screw sockets while the base less the portion is left behind on the automobile body, permitting the rearview mirror to fall off the automobile body.

In this conventional fastening means, part of the base, namely, the portions surrounding the screw sockets are destined to break when the mirror proper falls from the automobile body under the impact as described above. When the fallen part of the fastening means is desired to be secured again on the automobile body, therefore, the remaining base must be replaced with a new one. At the same time, the several setscrews formerly used in setting the base fast on the automobile body also require replacement with new setscrews. This fastening means contains weak portions around the screw sockets formed in advance in the base. If the setscrews to be used for setting the fastening piece to the base are handled roughly, therefore, there is a possibility that the impact of the rough handling will break these weak portions. Special care to be exercised in handling the setscrews has a possibility of causing a delay in the work involved.

SUMMARY OF THE INVENTION

In view of the state of affairs described above, an object of this invention is to provide fastening means for a rearview mirror in the automobile interior which ensures smooth release of the mirror under the impact, enables itself to be set fast to the automobile body by an ordinary work using setscrews without requiring paying of any special care to the handling of setscrews, and limits to a small size the part of the means to be broken to permit release of the mirror, and which is inexpensive and easy to repair.

To accomplish the object described above according to the present invention, there is provided a fastening means for a rearview mirror in an automobile body, which comprises a fastening base formed at the basal end of a supporting arm of the rearview mirror, a fitting member provided with a tubular screw-receiving portion and a flange-shaped engaging portion having thin-walled portions and a setscrew adapted to secure the fixing member to the automobile body.

The rearview mirror can easily be secured on the automobile body by insertingn the screw-receiving portion into a perforation bored in the fastening base and driving the setscrew into the automobile body through the screw-receiving portion. When an impact which is caused by colliding a human body into the rearview mirror for example, is exerted to bear on the mirror, the impact breaks the thin-walled portions to permit the rearview mirror to fall off the automobile body without breaking the automobile body.

The other objects and characteristics of the present invention will become apparent from the further disclosure of the invention to be made hereinafter with reference to the accompanying drawings.

DESCRIPTION OF THE PREFERRED EMBODIMENTS

Figure 1:
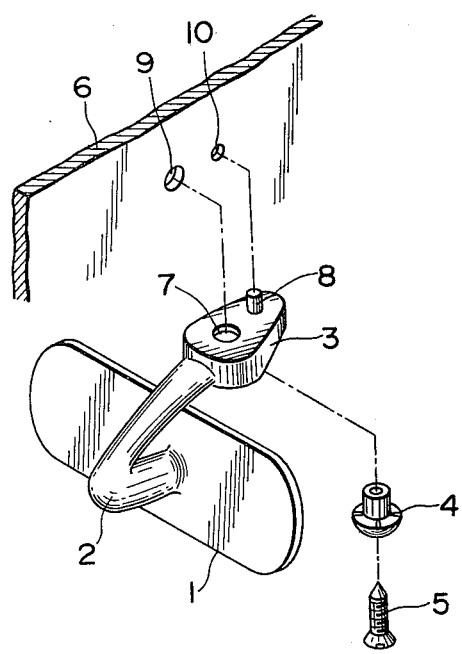
FIG. 1 is a perspective view of the fastening means in disassembled state according to this invention.

In FIG. 1 illustrating in an exploded manner a typical example of the fastening means according to the present invention, 1 denotes a rearview mirror, 2 an arm for supporting the rearview mirror, 3 a fastening base disposed integrally at the basal end of the arm, 4 a fixing member, and 5 a setscrew for securing the fastening base 3 to an automobile body 6 through the medium of the fixing member 4.

The fastening base 3 is made having a plate of a thick wall and is provided at the center thereof with a perforation 7. On the upper surface of the fastening base 3 apart from the perforation, there is provided a boss 8. In the automobile body 6 to which the fastening base is to be attached, a screw-receiving hole 9 is bored in opposition to the perforation 7 and a small perforation 10 for receiving the boss 8 is formed.

Figure 2:
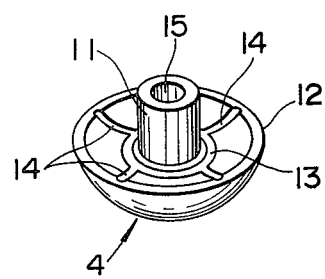
FIG. 2 is an enlarged perspective view of the fixing member of the fastening means.
Figure 3:
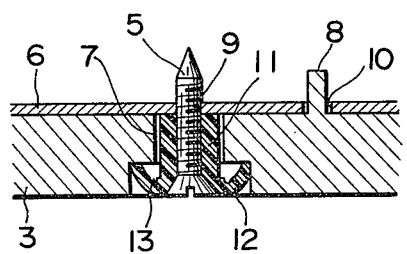
FIG. 3 is an enlarged longitudinal cross section of the essential part of the fastening means in an attached state.

The fixing member 4 is integrally molded of a synthetic resin such as polyacetal. As shown in an enlarged scale in FIG. 2, the fixing member 4 comprises a tubular screw-receiving portion 11 and an engaging portion 12 formed in the shape of a flange on the peripheral surface specifically in the present embodiment, on the peripheral surface along one open edge, of the screw-receiving portion 11. In one surface (the upper surface in the drawing) of the engaging portion 12, a circular groove 13 is formed along the periphery of the screw-receiving portion and a plurality of grooves 14 is joined to the circular groove and extended radially to the peripheral edge of the flange, to give rise to a thin-walled portion in the engaging portion.

The perforation 7 which is formed in the fastening base 3 is for insertion of the fixing member 4. In the illustrated embodiment, the perforation 7 is formed in the shape of a stepped circular hole having a larger inside diameter in part of the length thereof than in the remaining length in conformity with the profile of the fixing member 4, so that the part of the perforation 7 having a smaller diameter will embrace the screw-receiving portion 11 and the remaining part having a larger diameter will accommodate the engaging portion 12 respectively. When the upper surface of the engaging portion 12 comes into contact with the step in the perforation 7, the leading end of the screw-receiving portion 11 falls flush with the upper surface of the fastening base. The setscrew 5 is adapted to pierce through the hollow portion 15 of the screw-receiving portion 11 and protrude from the upper open end of the screw-receiving portion 11.

The attachment of the device of this invention constructed as described above to the automobile body 6 is accomplished by bringing the fastening base 3 into contact with the automobile body 6 with the boss 8 thrust into the small perforation 10 thereby registering the screw-receiving hole 9 of the automobile body with the perforation 7 of the base 3, then opposing the fixing member 4 upwardly to the lower end of this perforation 7 and setting it into the perforation as described above, and subsequently passing the setscrew 5 through the hollow portion 15 of the screw-receiving portion 11 of the fixing member 4 and driving it into the screw-receiving hole 9.

Figure 4:
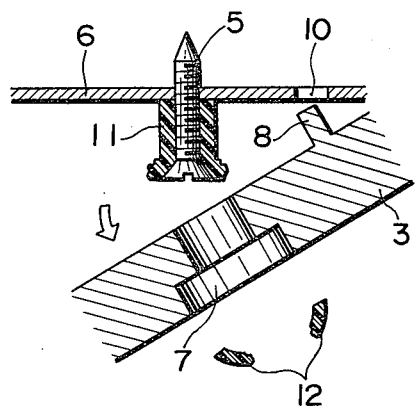
FIG. 4 is an enlarged longitudinal cross section of the essential part of the fastening means illustrating the condition in which part of said fastening means fractures under an impact.

The fastening means of this invention constructed as described above, while in its normal condition, is kept fast in position by the fixing member 4 which is fixed on the automobile body 6 by use of the setscrew 5. When an impact is exerted to bear on the rearview mirror 1 or the arm 2 supporting the mirror, the impact is transmitted to the engaging portion 12 of the fixing member 4 supporting the fastening base 3. Consequently, the impact breaks the thin-walled portions, specifically the groove 13 and the grooves 14, of the engaging portion 12 and destroys the shape of the flange (FIG. 4). The fastening base 3, now divested of its support, falls from the automobile body while leaving adjacent the screw-receiving hole 9 the fixing member 4 on the automobile body. In this manner, the otherwise possible infliction of injuries to the human body by the rearview mirror can be precluded.

As described above, the fastening means of the present invention never fails to release the rearview mirror proper under the impact. Moreover, since the fastening base is attached to the automobile body through the medium of the fixing member 4 and the fixing member is secured to the automobile body by use of the setscrew 5, the simple work of replacing the broken fixing member 4 with a new fixing member and tightening one setscrew passed through the new fixing member will suffice for the repair of the fastening means. Thus, the repair can be effected easily and quickly.

During the tightening of the setscrew, the screw-receiving portion of the fixing member is held fast in contact with the automobile body. The tightening of the setscrew, therefore, Serves substantially solely to tighten up the screw-receiving portion which has a tubular shape. The torque arising from the tightening work does not directly act upon the engaging portion 12. The tightening, therefore, does not break the thin-walled portions. The fastening means of the present invention, accordingly, has the advantage that it can be secured on the automobile body quickly and accurately without requiring any special attention to be paid to the work involved.

In the embodiment described above, the fastening base is provided on the upper surface thereof with the boss 8. As described above, this boss is intended to aid in setting the fixing member 4 in exact correspondence with the automobile body and to prevent the fastening base secured on the automobile body from being rotated around itself. Optionally, two perforations 7 may be formed in the fastening base, fixing member 4 inserted one each through the perforations, and setscrews passed therethrough and tightened into the screw-receiving holes formed correspondingly on the automobile body instead of using the boss 8.

Figure 5:
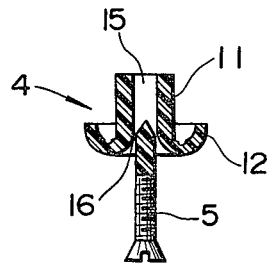
FIG. 5 is a partially sectioned front view illustrating another embodiment of the combination of the fixing member and the setscrew.

In the embodiment described above, the fixing member 4 and the setscrew 5 are formed separately of each other. Optionally, the fixing member 4 and the setscrew 5 may be integrally molded of one and the same material in such a manner that the setscrew will continue into the open end of the screw-receiving portion 11 through a thin-walled piece 16 as shown in FIG. 5. At the time that the setscrew 5 is to be actually used for attaching the fixing member 4 to the automobile body, the setscrew 5 will be turned about itself and consequently torn off the thin-walled piece 16 and then driven into the screw-receiving hole 9 in the automobile body. Alternatively, when the fixing member 4 is molded, a metal screw may be inject molded within the screw-receiving portion thereof so that the metal screw and the screw-receiving portion will form an integral combination. By having the fixing member 4 and the setscrew 5 integrally combined as described above, the management of parts can be made easy and the workability of the whole fastening means can be enhanced.

What is claimed is:

1. A fastening means for a rearview mirror in an automobile body, which comprises a fastening base integrally formed at the basal end of an arm for supporting the rearview mirror, a fixing member made of a synthetic resin, and a setscrew adapted to secure said fixing member to the automobile body, said fixing member being provided with a tubular screw-receiving portion and a domelike flange-shaped engaging head portion extended from the peripheral surface of said screw-receiving portion, said engaging portion on the side opposite to the tubular portion being convex and having an underlying peripheral surface engageable with said base, said engaging head portion being provided with thin-walled portions for enabling said flange shape of the engaging portion to be broken under an impact, said thin walled portion comprises an annular groove encircling said tubular member and a plurality of grooves radiating outwardly therefrom, said fastening base being provided with a perforation for permitting insertion therein of the screw-receiving portion of said fixing member thereby enabling said engaging portion to come into fast engagement with the edge of the perforation, and said setscrew being adapted to be passed through the hollow part of said screw-receiving portion and driven helically into the automobile body, whereby said fastening base is attached fast to the automobile body through the medium of said fixing member.

2. The fastening means accordingly to claim 1, wherein said fixing member and the setscrew are integrally molded through the medium of a thin-walled piece.

* * * * *